(12) United States Patent
Ahrweiler

(10) Patent No.: US 6,230,744 B1
(45) Date of Patent: May 15, 2001

(54) VALVE ARRANGEMENT AND VALVE FOR THE SAME

(75) Inventor: Karl-Heinz Ahrweiler, Willich (DE)

(73) Assignee: Eduard Kusters Maschinenfabrik GmbH & Co. KG, Krefeld (DE)

( * ) Notice: Subject to any disclaimer, the term of this patent is extended or adjusted under 35 U.S.C. 154(b) by 0 days.

(21) Appl. No.: 09/367,420

(22) PCT Filed: Feb. 4, 1998

(86) PCT No.: PCT/DE98/00307

§ 371 Date: Oct. 19, 1999

§ 102(e) Date: Oct. 19, 1999

(87) PCT Pub. No.: WO98/36122

PCT Pub. Date: Aug. 20, 1998

(30) Foreign Application Priority Data

Feb. 12, 1997 (DE) .............................. 197 05 259

(51) Int. Cl.[7] ...................................... F16K 11/08
(52) U.S. Cl. ............................... 137/625.47; 137/625.19
(58) Field of Search ......................... 137/625.19, 625.47

(56) References Cited

U.S. PATENT DOCUMENTS

| 1,854,307 | * | 4/1932 | Hapgood | 137/625.19 |
|---|---|---|---|---|
| 2,558,260 | | 6/1951 | Maky. | |
| 3,773,076 | * | 11/1973 | Smith | 137/625.19 |
| 5,445,187 | * | 8/1995 | Farquhar | 137/625.32 |
| 6,158,467 | * | 12/2000 | Loo | 137/625.19 |

FOREIGN PATENT DOCUMENTS

| 20 19 900 | 5/1977 | (DE). |
|---|---|---|
| 24 58 104 | 2/1978 | (DE). |
| 29 00 712 | 7/1980 | (DE). |
| 36 37 452 | 5/1988 | (DE). |
| 92 18 012 | 8/1993 | (DE). |
| 2 539 204 | 7/1984 | (FR). |

OTHER PUBLICATIONS

"Catalog of U.S. Valves" p. 148 (1984).

* cited by examiner

*Primary Examiner*—John Fox
(74) *Attorney, Agent, or Firm*—Kenyon & Kenyon

(57) ABSTRACT

A valve arrangement for fluid media, with a plurality of valves (50), which are arranged in a common housing (20). Each valve has at least two feeds (57, 58) and an outlet channel (54), with all the outlet channels (54) emptying into a common outlet zone (11). An example of use is a patterning device for webs (10) of carpeting, where the common valve housing (20) is an application bar, and the outlet zone (11) is a narrow application slit, from which the patterning agent (dye bath) which forms the fluid medium is transferred directly to the web (10) from the application slit.

4 Claims, 5 Drawing Sheets

VALVE ARRANGEMENT AND VALVE FOR THE SAME

The present invention relates to a valve arrangement for fluid media and to a valve provided for it.

The object of the present invention is to create a valve arrangement and a corresponding valve, in which an outflow can be made up in defined manner, from a plurality of feed flows, which outflow can be transferred to a common outlet zone.

The object is achieved by the invention reproduced in claim 1.

With this valve arrangement, each valve can contribute at least two selectable components to the total outlet amount, so that the total outlet amount can be varied in precise manner.

In the preferred embodiment of the invention, a common valve housing is provided for several valves, particularly also for all the valves of the valve arrangement, in which the valve chambers and valve bodies are arranged (claim 2). This results in a valve block, in which the common outlet zone can be formed.

In accordance with claim 3, the valve arrangement can have a control mechanism assigned to it, by means of which all the valves can be activated separately.

Using the control mechanism, the composition of the total outlet amount can be influenced in accordance with a predetermined program, for example.

The total outlet amount can be handled in two different ways: It is possible that the components contributed by the individual valves to the total outlet amount are kept separate until they are used, or that they are mixed. The significance of this difference will become clear using the preferred exemplary embodiment of the handling of dye baths for patterning or dyeing textile goods. As will be described using the exemplary embodiment, in one exemplary embodiment the invention can include a bar-like common valve housing for all the valves, which are lined up in a row along the bar, and whose outlet channels open into a common outlet zone in the form of an outlet slit that extends along the bar. From the exit slit, the bath is immediately transferred to a textile web which is being guided past it, for example a carpet web. From the individual valve to the exit location of the exit slit, there is only a short distance to travel. The amounts of bath given off by the individual valves essentially remain in place crosswise relative to the web, i.e. they remain unmixed.

Another case of use of the invention is the preparation of dye baths. The valves are connected with the supply containers for the basic components, and the valves which correspond to the components required for the production of a specific dye bath are opened. In this case, of course, the individual components are specifically not supposed to remain unmixed, but rather are mixed together to produce the final dye bath. In this connection, the "outlet zone" is therefore a common line, for example, into which the outlet channels of all the valves empty.

The present invention also covers a valve that is particularly suitable for use in the valve arrangement according to the invention, and is described in claim 4.

Here, the outlet channel is directed into the outlet zone, in the flow direction of the patterning agent, so that the individual amounts of patterning agent or patterning agents which pass through the plurality of valves enter into the outlet zone parallel to one another. This is particularly important for the slit-shaped outlet zone which was already discussed, from which a fluid medium formed as a patterning agent (dye bath) passes immediately to a web, because here the tendency toward mixing in the adjacent regions, as the medium flows through the outlet zone, is minimized.

It is practical if the valve body is arranged in a cylindrical valve chamber of the application bar, coaxial to the axis of rotation (claim 5), where in accordance with claim 6, each valve has at least two feed channels assigned to it, which open from two opposite sides into the valve chamber, in the same axial position of the chamber, and which can be optionally brought into connection with the inlet which allows liquid to pass through, by rotating the valve body.

The outlet channel and thereby the section of the outlet zone assigned to it can therefore be optionally supplied with the one or the other patterning liquid, by switching the valve.

According to claim 7, the valve has at least three activation positions, in which the inlet is connected with the one or the other feed channel, or is closed.

In an advantageous construction according to claim 8, the valve has a spherical center part, in which the inlet is formed.

If there is a spherical center part, the design can be such as in claim 9, in particular, thereby creating the possibility of supplying the inlet from one feed channel, while the other feed channel or the other feed channels are connected with the return, in each instance. The pumps assigned to the feed channels can therefore continue to run, without any shut-off pressure changes, with the patterning agent in the feed line not connected with the inlet not reaching the web.

The valves can each be activated individually, with separate drives, which can be implemented in the manner reproduced in claim 10.

In order to have the entry of patterning liquid into the outlet zone take place under defined geometric conditions, the design according to claim 11 is recommended.

To make the exit of agent more uniform, in accordance with claim 12, there can be a perforated metal sheet, a slit metal sheet, a grid, or a similar covering provided with a plurality of exit openings located close to one another, which is arranged just ahead of the exit opening of the outlet zone. The structural design according to claim 13 facilitates access to the individual valves when maintenance or replacement is required.

Taking the aspect of accessibility of the outlet zone, i.e. replacement of the glide surface, into consideration, the outlet part can be covered by a removable shoe that forms the slide surface, on the exit side, according to claim 14.

The width of the valves crosswise to the web, and therefore the width of the region of the outlet zone supplied by a valve, can be 20 to 60 mm (claim 15). Possible divisions are, in particular, 25 and 50 mm. The precision of the division also determines the precision of the pattern on the web produced using the device.

The drawing shows an exemplary embodiment of the present invention, in the form of a device for patterning carpet webs, which includes a so-called application bar, in schematic form.

Figure 7:
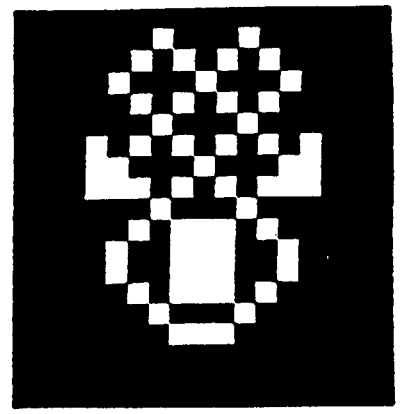
Figure 8:
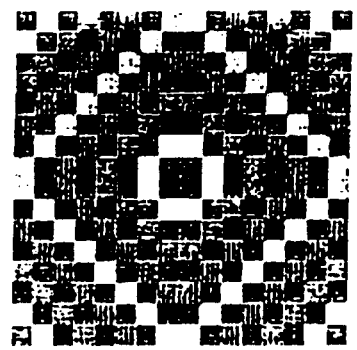
Figure 9:
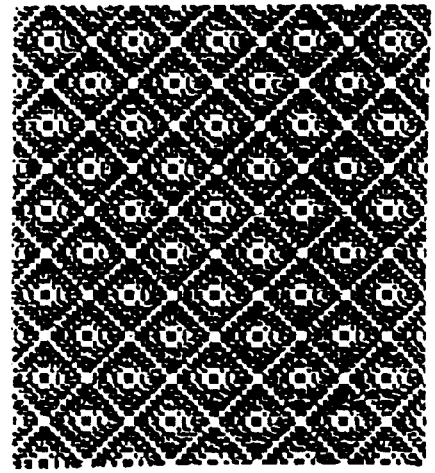

FIGS. 7, 8, and 9 are examples of patterns that can be produced.

Figure 1:
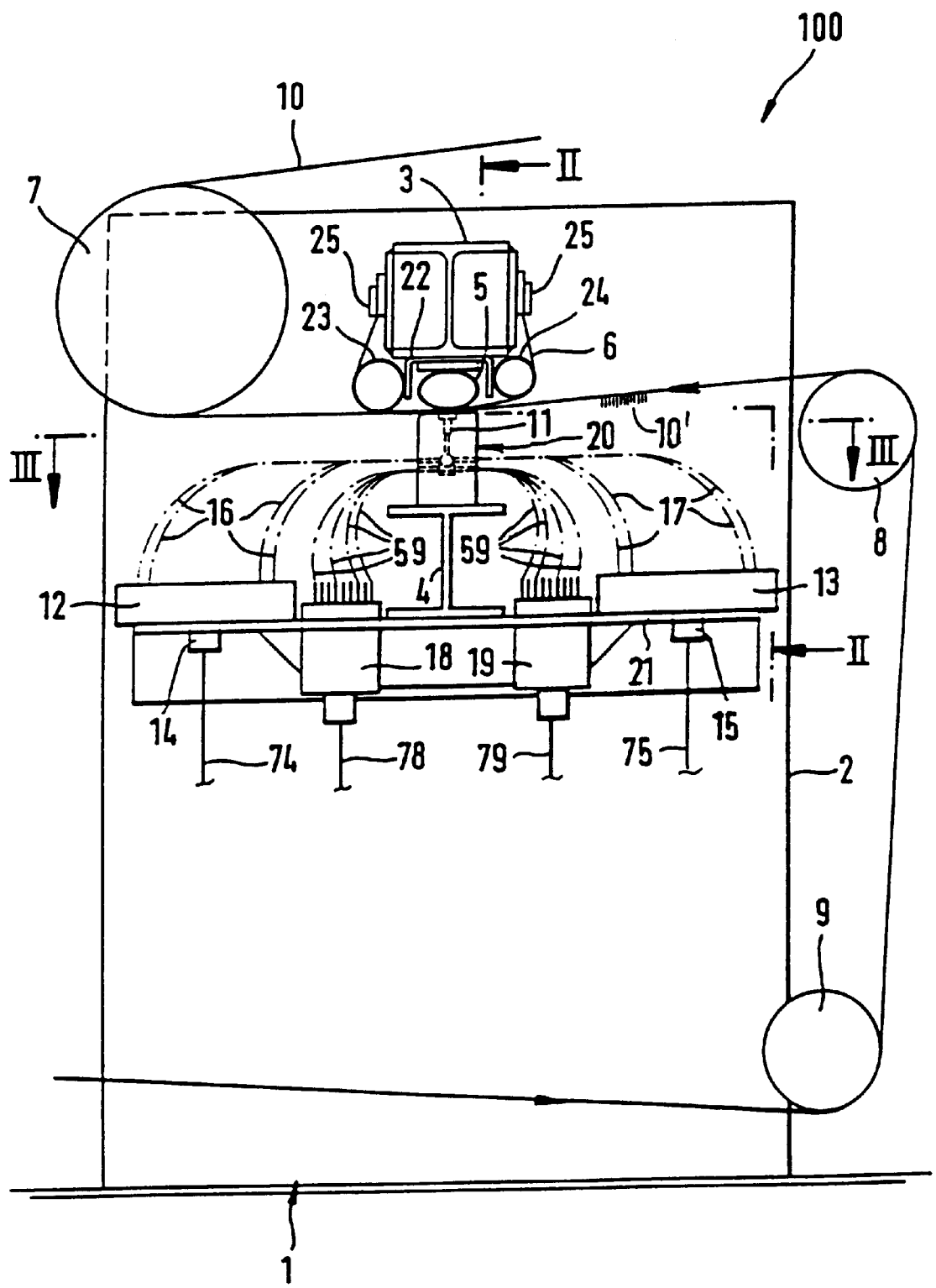
FIG. 1 shows a side view of a device with the application bar.
Figure 2:
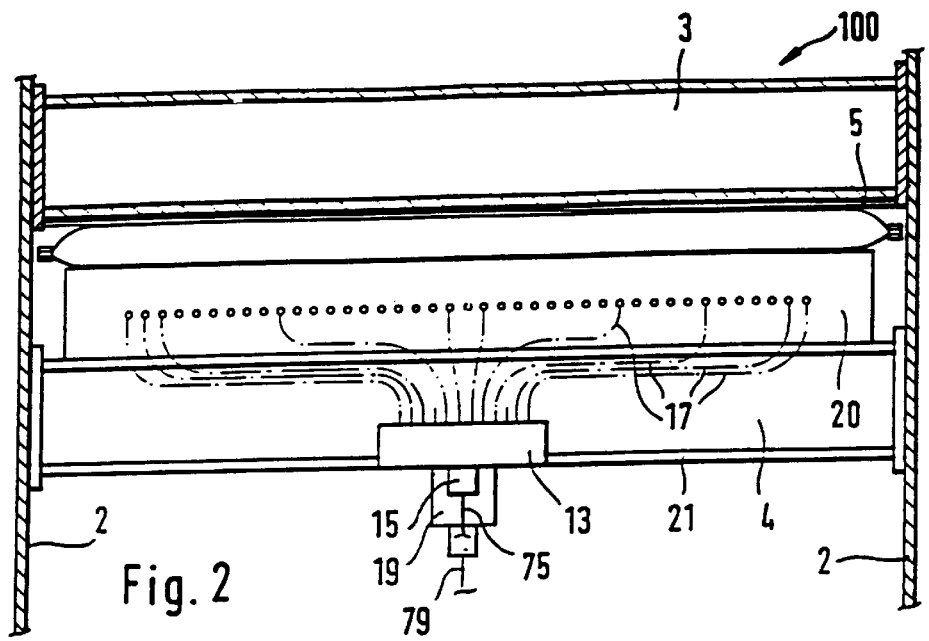
FIG. 2 shows a view along line II—II in FIG. 1.
Figure 3:
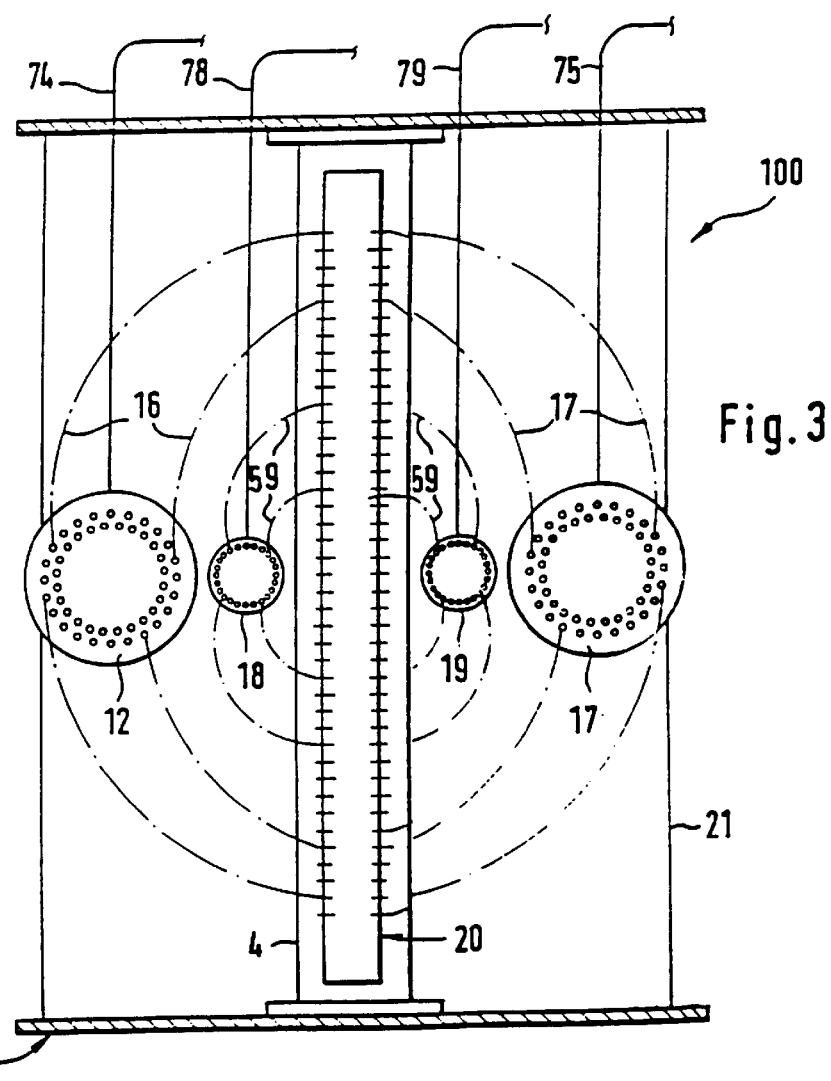
FIG. 3 shows a view along line III—III in FIG. 1.
Figure 4:
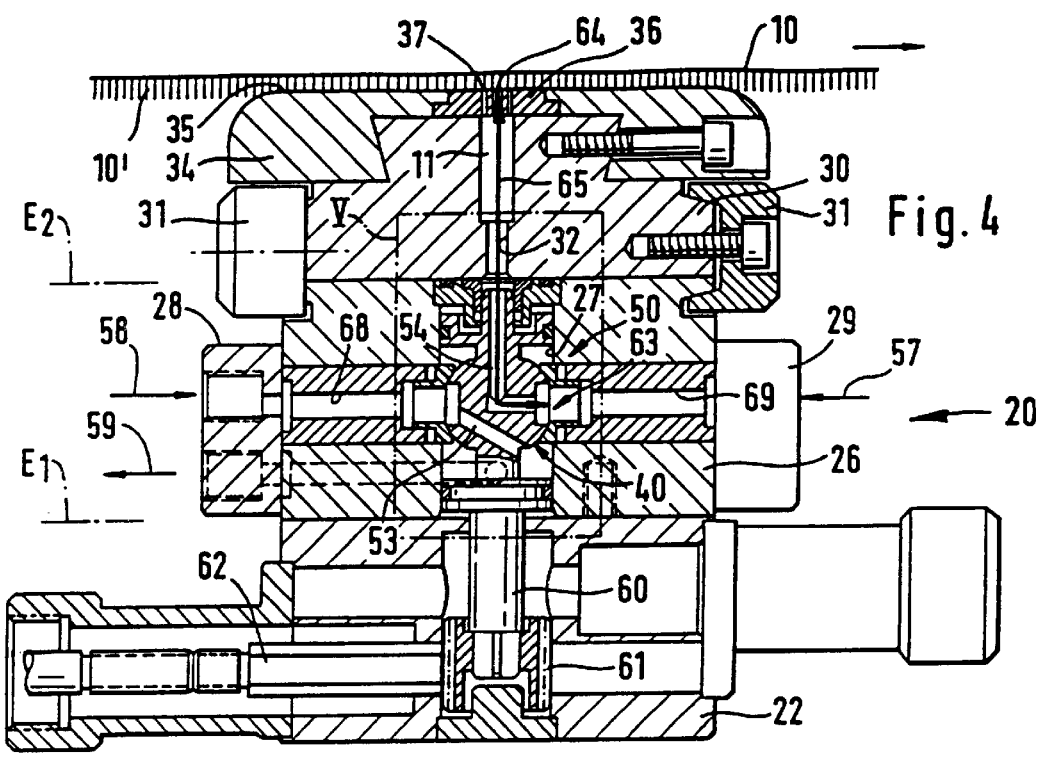
FIG. 4 shows a cross-section through the application bar.

The device indicated as a whole with 100 in FIGS. 1, 3, and 4 includes a machine frame 1 with two lateral, rectangular, upright frame plates 2 that stand opposite one another at a cross-wise distance, and which are connected with one another by two cross-beams 3, 4 arranged one above the other in the upper region, which are structured as I-beams and are arranged in the same vertical plane, a plane perpendicular to frame plates 2, 2. Upper cross-beam 3 forms a support bar for an inflatable, hose-shaped pressure cushion 5 which is arranged below it and extends between frame plates 2, 2, and below which a slide film 6 is stretched, against which pressure cushion 5 rests from above, as shown in FIGS. 1 and 3. Pressure cushion 5 is arranged between the shanks of a U-shaped profile 5' which is open to the bottom, leaving a space at the sides; tubes 23, 24 which run parallel to pressure cushion 5 rest against the shanks from the outside. Tubes 23, 24 and U-profile 5' are jointly wrapped by slide film 6, which is fixed in place by its edges at 25, at the sides of cross-beam 3. In this way, vibrations of pressure cushion 5 and slide film 6 in the running direction of web 10 are avoided.

A first deflection roller 7 is arranged between frame plates 2, 2, in the vicinity of one vertical edge, at the level of cross-beam 3, and two additional deflection rollers 8, 9 which lie one above the other and below the first, are arranged below it at the opposite vertical edge, with deflection roller 8 having its top approximately at the level of the bottom of pressure cushion 5. Web 10 is guided from below, around deflection roller 9, to the top, around deflection roller 8, and then essentially horizontally, with the pile facing down, through below slide film 6, around deflection roller 7, as shown in FIG. 1, and then is passed out of device 100 to the right, as also shown in FIG. 1.

Cross-bar 4, which is arranged below and at a distance from cross-bar 3, serves as a support bar for application bar 20 which is arranged on it, and which extends between frame plates 2, 2, perpendicular to them, almost over the entire distance between them, and forms the common valve housing for a plurality, for example one hundred or two hundred individual valves 50.

Figure 5:
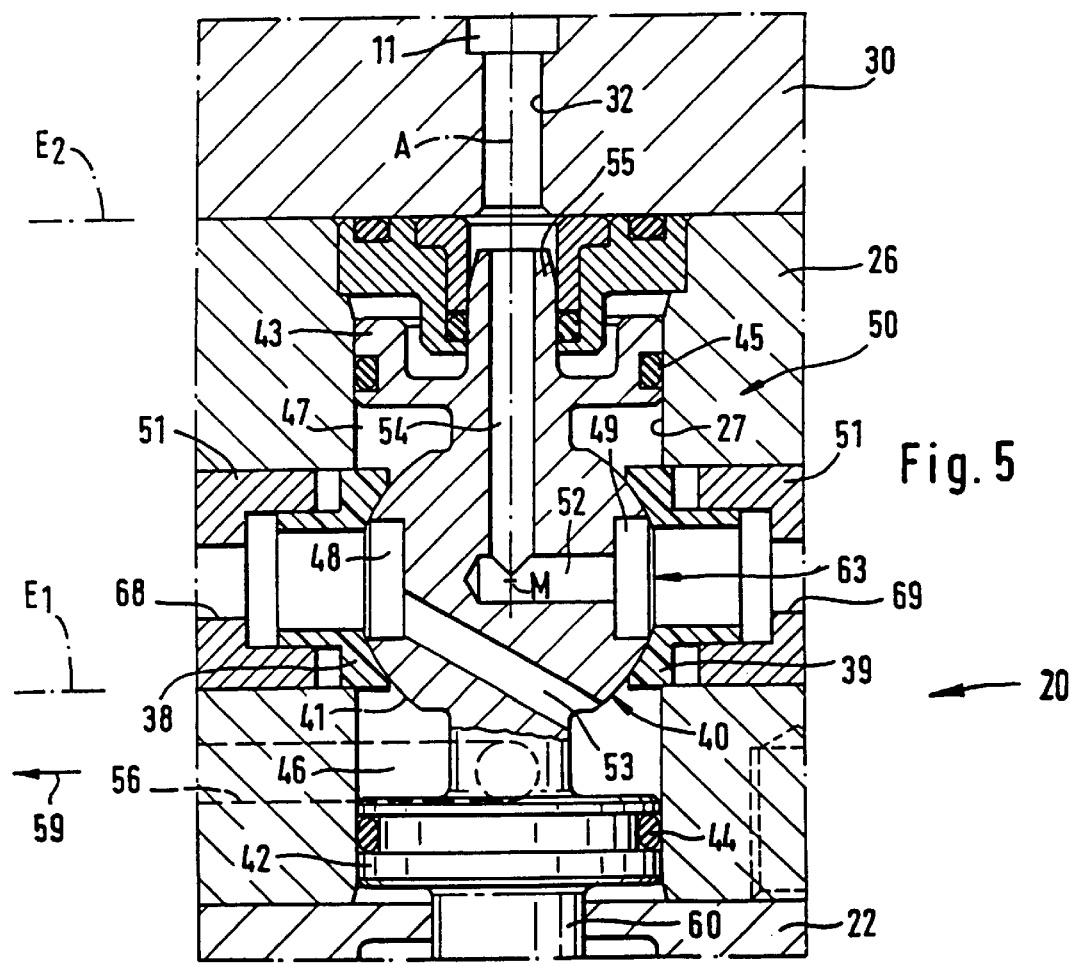
FIG. 5 shows an enlarged view of the region indicated with V in FIG. 4.

Application bar 20 is described in detail using FIGS. 4 and 5. It includes an outlet zone 11, which is open to the top in FIG. 1 and extends crosswise over the width of web 10, from which a patterning agent, for example a dye liquid, exits upward into pile 10' of web 10, according to FIG. 1, which is structured as a carpet web in the exemplary embodiment, as is indicated by the pile reproduced at 10'. Web 10 passes over outlet zone 11 with pile 10' facing down.

Web 10 slides along outlet zone 11 over the top of application bar 20, with a patterning agent which forms the fluid medium, a dye bath in the exemplary embodiment, being pressed into pile 10' of web 10 there. At the side opposite outlet zone 11, the back of web 10 slides along slide film 6, which is elastically supported by pressure cushion 5. The exit region of outlet zone 11 is therefore sealed by web 10 itself on the sides, because web 10 is pressed against the edges of outlet zone 11 with a certain pressure.

Figure 6:
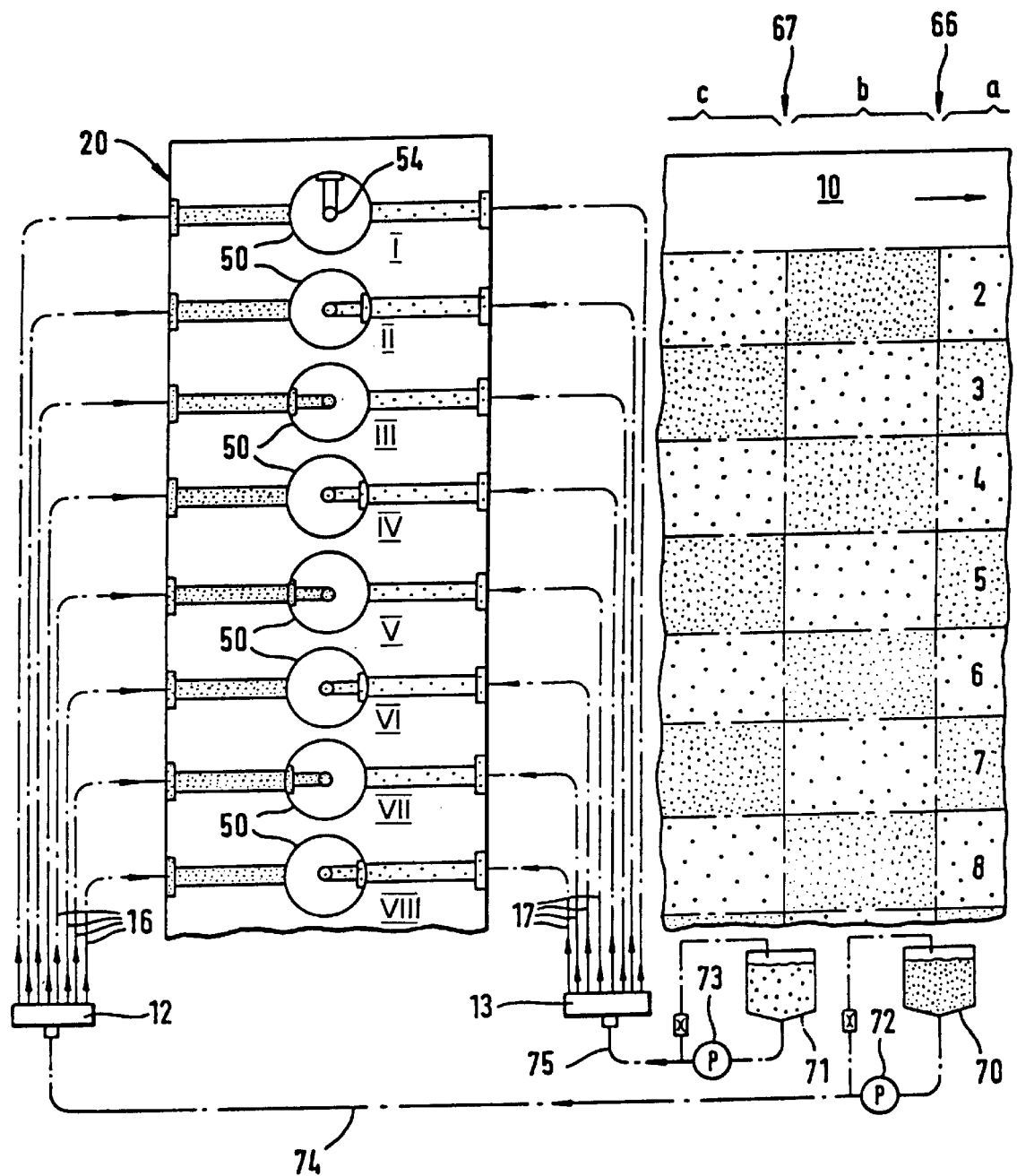
FIG. 6 is a schematic representation of the pattern being formed.

In the exemplary embodiment, two patterning agents are supplied to application bar 20, from corresponding distributors 12, 13, which are connected with corresponding supply containers 70, 71 at connections 14, 15, via lines 74, 75, from which containers the patterning agents are brought in under pressure, by pumps (FIG. 6). In distributors 12, 13, the patterning agents are divided up among a plurality of individual lines 16 and 17, in each instance, which open into application bar 20 at locations distributed over the working width.

18 and 19 are collector heads into which returns 59 described in connection with FIGS. 4 and 5 empty, and from which the patterning agent which was not applied is passed back to supply containers 70, 71 via lines 78, 79, or into the sewer. The entire arrangement is housed on a horizontal cross-plate 21 below cross-beam 4.

As is evident from FIG. 4, application bar 20 has an essentially rectangular, upright cross-section. It has several parts which in turn also have a rectangular cross-section, which are arranged one above the other. Bottom part 22 is the drive part. Valve part 26 is attached to it, and includes a plurality of cylindrical valve chambers 27 lined up in rows perpendicular to web 10, crosswise to the working width, parallel to one another, the axes A of which all lie in the exit plane, i.e. the longitudinal center plane of application bar 20, and particularly of outlet zone 11, which is perpendicular to web 10.

Exit part 30 is attached to valve part 26 by clamps 31. Exit part 30 has an outlet zone 11 which is continuous over the working width and is open towards web 10, and an intermediate channel 32 formed by a bore at the location of each valve chamber 27, coaxial to it.

The top of exit part 30 is covered by a slide shoe 34, which forms a slide surface 35, on which web 10 slides along with pile 10'. Slide shoe 34 is divided in the manner shown in FIG. 4, and holds a perforated plate 36 in place in front of the opening of outlet zone 11, which plate has a plurality of small passage bores 37 in the cross-sectional region of outlet zone 11, closely spaced together and uniformly distributed, through which the patterning agent located in outlet zone 11 can pass into web 10, uniformly distributed.

In each valve chamber 27, a valve body 40 is arranged to rotate; it has a spherical center part 41 and, on both sides of it, at a slight axial distance, a disk-shaped sealing ridge 42, 43 in each instance, with a circumference seal 44, 45 which forms a seal towards the inside circumference of valve chamber 27. The diameter of spherical center part 41 approximately corresponds to that of valve chamber 27.

Ring spaces 46, 47 are formed between spherical center part 41 and sealing ridges 42, 43, which spaces are sealed axially towards the outside by sealing ridges 42, 43.

Valve body 40 has connecting points 48, 49 in its spherical center part 41, which lie opposite one another, and sealing bushings 38, 39 which have a spherical sealing surface rest against their edges on the spherical surface from the outside. Sealing bushings 38, 39 are arranged in sleeves 51, which are affixed on diametrically opposite sides of the spherical center part, in valve part 26, and form feed channels 68, 69. Sleeves 51 pass through valve part 26 all the way to the outside, and produce the connection with connector pieces 28, 29, which are attached at the two opposite sides of valve part 26.

The embodiment described relates to the case where two patterning agents can be supplied to each valve 50, at two feed channels 68, 69. For practical purposes, this is the most important case, but it would fundamentally be possible, although more difficult in design terms, to have more than two patterning agents supplied to each valve 50.

From inlet location 49 (FIG. 5), an inlet 52 formed by a radial bore with reference to the spherical center point M goes to the center of the spherical part, and there passes into an outlet channel 54 which runs in the axial direction of valve body 40, which channel extends as a connector-type projection 55 beyond the outer face of sealing ridge 43 and aligns with intermediate channel 32 in exit part 30 which is located there. The diameter of intermediate channel 32 is slightly greater than that of exit channel 54.

A slanted channel 53 leads from opposite inlet location 48 into ring space 46 which lies opposite outlet channel 54 with reference to spherical center point M, and this space in turn is connected with connector piece 28 and return 59 via a channel 56, shown with broken lines.

In the working phase shown in FIGS. 4 and 5, a first patterning agent is supplied to connector piece 29 from one of supply containers 70, 71, via one of distributors 12, 13, at a feed 57, and this patterning agent is transferred to web 10 via feed channel 69, into sleeve 51, inlet 52, outlet channel 54, intermediate channel 32, and outlet zone 11. Pumps 72, 73 of both patterning agents run constantly. While feed to web 10 takes place via feed 57, the other patterning agent is also supplied via feed 58. However, it reaches ring space 46 via feed channel 68, inlet location 48, and slanted channel 53, and from there goes right back into return 59, via channel 56, i.e. it circulates in its line system or is drawn off. In this manner, pumps 72, 73 can run continuously, without pressure surges in the patterning liquids.

If the other patterning agent is supposed to reach web 10, valve body 40 is turned by 180° in valve chamber 27, so that inlet location 49 now is connected with feed 58, and the patterning agent supplied to feed 57 gets into return 59.

The drive in this switching-rotation movement comes via a coaxial drive journal 60 arranged in the axis of valve body 40 and reaching into drive part 22, which journal carries a pinion 61 at its end, which pinion can be activated in any desired manner by a drive element 62, which engages from the side into drive part 22. For the invention, the way in which rotation of pinion 61 is produced does not play any further role. Drive element 62 can have a rack-like structure and perform a longitudinal stroke. However, it is also possible that drive element 62 rotates and forms a worm-wheel drive with pinion 61.

It is important that the segment reproduced by arrow 65, from closing location 63 of valve body 40 to exit location 64 of outlet zone 11 at web 10, is as short as can be arranged in design terms.

In the exemplary embodiment, this segment is approximately 6 cm. Segment 65 is determined by the expanse of valve body 40 and the expanse of exit part 30, where in the latter, outlet zone 11 must have a certain cross-section and therefore a certain depth, because of pressure equalization and uniform distribution of the patterning agent, without any tendency toward crosswise flow.

FIG. 6 shows an operational example in which a pattern of rectangular pattern fields is produced on web 10. The one end of application bar 20 with the first eight valves 50, numbered accordingly, is shown. Outermost valve 1, shown at the top of FIG. 6, takes the 90° position, i.e. it is closed. In its region, no patterning agent is applied to web 10, which is shown on the right in FIG. 6. The reason for this is that the irregularly contoured edge of web 10 is supposed to remain free of patterning agent, i.e. no patterning agent is supposed to exit outside of the edge of web 10.

In the left part of FIG. 6, the operational phase is shown, corresponding to application onto section a of web 10. Here valves 2, 4, 6, 8 receive patterning agent from distributor 13, and transfer it to web 10. This is indicated with widely spaced dots. Valves 3, 5, and 7, on the other hand, have received patterning agent from distributor 12, as shown by closely spaced dots.

A switch took place at location 66. Valves 2, 4, 6, 8, which were supplied from distributor 13 until now, then received patterning agent from distributor 12 while section b was passing through, as indicated by the closely spaced dots. Valves 3, 5, 7, which lie between them, received patterning agent from distributor 13. At location 67, another switch took place, so that the distribution of the fields in section c was the same as in section a. All valves 50 can be individually activated, i.e. their valve bodies 40 can be rotated via drives 60, 61, 62 assigned to them, in each instance, independent of any other valves 50. In view of the plurality of valves, it is practical to control them using a suitable programmable control.

If the device is used to dye with a single color, all valves 50 receive the same patterning agent, i.e. the same dye bath. The valves are not switched in single-color dyeing. Only if a switch is made to a different color are all the valves switched over to a different dye bath, all at the same time.

Patterning does not have to take place in the regular, checkerboard pattern shown in FIG. 6. By controlling valves 50 appropriately, individual patterns distributed over the surface of web 10, for example as shown in FIG. 7, can also be produced.

Device 100 can also include several application bars 20 arranged staggered one behind the other in the running direction of web 10, which give off patterning agent to web 10 one after the other. Using such an arrangement, more than two different patterning agents can be processed. It is understood that in this connection, the control mechanism must pay attention to a correct match between the individual application bars 20. In this way, patterns such as that in FIG. 8 can be produced; shown on a smaller scale, this pattern would have the appearance shown in FIG. 9 if used for a carpet.

What is claimed is:

1. A valve for fluid media, comprising:
   a valve housing defining a valve chamber;
   a valve body disposed in the valve chamber and rotatable along an axis of rotation defining an outlet channel extending along the axis of rotation, and a lateral inlet fluidly connected with the outlet channel;
   at least two feed channels opening into the valve chamber from opposite sides, adapted for selectively entering in fluid connection with the corresponding lateral inlet by rotating the valve body; and
   a return space adjacent to the valve body,
   wherein the valve body further comprises:
   a center portion;
   an inlet connecting port disposed on a center plane perpendicular to the axis of rotation on a periphery of the center portion, connected to the lateral inlet;
   at least one return connecting port disposed on a center plane perpendicular to the axis of rotation on a periphery of the center portion, connected to at least one corresponding slanted channel of the center portion leading to the return space;
   sealing ridges disposed at each axial end of the valve body, separated from the center portion by the return space; and
   a return line leading from the return space to outside of the valve housing, wherein, when the lateral inlet is in fluid connection with one of the at least two feed channels, the at least one return connecting port is adapted for entering in fluid connection with the other feed channels, so that each of the at least two feed channels is in fluid contact with a corresponding one of the inlet and return connecting port.

2. The valve according to claim 1, wherein the center part of the valve body is spherical.

3. The valve according to claim 1, wherein the valve body is adapted for rotation to a position in fluid connection with one of the at least two feed channels and to a closed position.

4. The valve according to claim 1, wherein the valve body further comprises a drive journal extending along the axis of rotation, opposite from an outlet of the outlet channel.

* * * * *